(12) United States Patent
Pinney

(10) Patent No.: US 7,001,652 B2
(45) Date of Patent: Feb. 21, 2006

(54) COMPOSITE FIBER-RESIN TUBE WITH DIAMETRAL FIBER TRUSS AND METHOD OF MANUFACTURE

(76) Inventor: Steve B. Pinney, 28053 Lakehurst Ave., Canyon Country, CA (US) 91351

( * ) Notice: Subject to any disclaimer, the term of this patent is extended or adjusted under 35 U.S.C. 154(b) by 167 days.

(21) Appl. No.: 10/616,237

(22) Filed: Jul. 8, 2003

(65) Prior Publication Data
US 2004/0062893 A1    Apr. 1, 2004

Related U.S. Application Data

(60) Provisional application No. 60/395,147, filed on Jul. 9, 2002.

(51) Int. Cl.
*B64C 3/20*    (2006.01)

(52) U.S. Cl. .................. 428/35.7; 428/36.3; 428/36.9
(58) Field of Classification Search ............... 428/35.7, 428/36.3, 36.9
See application file for complete search history.

(56) References Cited

U.S. PATENT DOCUMENTS

| | | | |
|---|---|---|---|
| 3,813,837 A | 6/1974 | McClain et al. | |
| 4,007,075 A | 2/1977 | McClain et al. | |
| 4,292,101 A | 9/1981 | Reichert | |
| 4,318,948 A | 3/1982 | Hodgson | |
| 5,437,899 A | 8/1995 | Quigley | |
| 5,450,870 A | 9/1995 | Suga | |
| 5,582,744 A * | 12/1996 | Abel | .......................... 210/808 |
| 5,860,877 A | 1/1999 | Esser | |

FOREIGN PATENT DOCUMENTS

| | | | |
|---|---|---|---|
| DE | 10260496 A1 | * | 7/2004 |
| JP | 03119188 A | * | 5/1991 |

* cited by examiner

*Primary Examiner*—Sandra Nolan Rayford
(74) *Attorney, Agent, or Firm*—Kelly Lowry & Kelley, LLP

(57) ABSTRACT

A composite fiber-resin structural member includes a composite fiber-resin tube having a central axis, and an elongated truss. The truss has a longitudinal axis and includes at least two wires and a plurality of diametral carbon fibers which forms circular bundles around the wires. The truss fits within the fiber-resin tubing such that the central axis of the fiber-resin tubing and the longitudinal axis of the truss are coaxial. The diametral fibers are connected to the fiber-resin tubing with resin, and are of substantially equal length from the longitudinal axis of the truss. Preferably, at least one of the wires of the truss is mechanically textured to include a consistent and repeating distortion along at least a portion of its length.

15 Claims, 2 Drawing Sheets

COMPOSITE FIBER-RESIN TUBE WITH DIAMETRAL FIBER TRUSS AND METHOD OF MANUFACTURE

RELATED APPLICATION

This application claims priority from Provisional Application Ser. No. 60/395,147, filed Jul. 9, 2002.

BACKGROUND OF THE INVENTION

The present invention relates to composite fiber-resin structural members. Specifically, the present invention relates to composite fiber-resin structural members with a diametral fiber truss and method of manufacture. The manufacture of structural members using carbon fibers in an adhesive matrix is well known. While these carbon fiber systems tend to be strong, they still tend to be quite heavy.

Other carbon fiber systems have favorable strength to weight ratios but do so at the expense of wasted materials and manufacturing time. For instance, one carbon fiber process impregnates woven fibers with viscous epoxy and then vacuums the excess through siliconized fabric which is peeled off after setting. The result is an excellent strength to weight ratio in hollow geometrical or tubular shells, but the process is quite wasteful both in materials and manufacturing time. Other processes attain strength with successive layers or plies first at right angles and then on the bias.

Accordingly, there is a need for a carbon fiber structural member and method of manufacture that will allow for the efficient manufacture of a lightweight carbon fiber structural member. The present invention fulfills these needs and provides other related advantages.

SUMMARY OF THE INVENTION

It is the object of the present invention to provide a lightweight structural member of composite fiber-resin construction with interior fiber trussing using a minimum of adhesives.

It is another object of the present invention to provide a method of manufacture of the composite fiber-resin structural member.

The present invention resides in a composite fiber-resin system and method for manufacture comprised of a composite fiber-resin tube and a diametral fiber truss. The diametral fiber truss is configured to fit within the composite fiber-resin tubing and gives the composite fiber-resin tubing structural support.

The diametral fiber truss is manufactured by placing diametral fibers between two wires and then twisting the wires causing the fibers to spirally rotate forming a screw of diametral fibers with the wires as its axis. The diametral fibers are then cut equidistant from the wires thus describing a nearly perfect cylinder by their tips.

The diametral fiber truss is then inserted into the composite fiber-resin tubing and the tips of the diametral fibers are attached to the inside of the composite fiber-resin tubing using a resin. The diametral fibers are attached using only enough resin such that the strength of the bond is substantially equal to the tensile strength of the diametral fibers thereby maximizing the strength to weight ratio of the composite fiber-resin structural member.

Other features and advantages of the present invention will become apparent from the following more detailed description, taken in conjunction with the accompanying drawings which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

Figure 6:
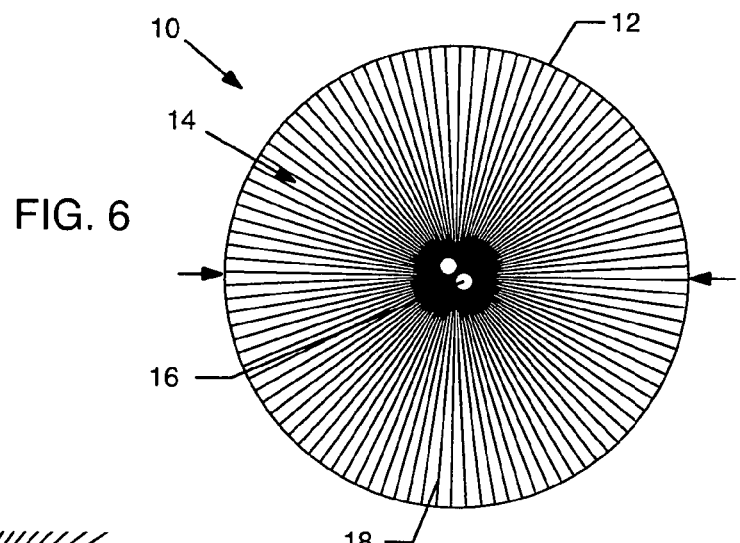
FIG. 6 is a cross-sectional end view of a composite fiber-resin tube showing one turn of the diametral fiber truss of FIG. 4 therein.

As shown in the drawings for purposes of illustration, the present invention is concerned with a composite fiber-resin structural member generally illustrated in FIG. 6 and referred to by the reference number 10. According to a preferred embodiment of the present invention, the composite fiber-resin structural member 10 is generally comprised of a composite fiber-resin tubing 12 and a diametral fiber truss 14. The diametral fiber truss 14 fits within the composite fiber-resin tubing 12 and is configured to give structural support to the composite fiber-resin tubing 12. The composite fiber-resin tubing 12 is preferably made of a carbon fiber.

Referring to FIGS. 1–5, the diametral fiber truss 14 is comprised of two wires 16 and 16', and diametral fibers 18. The diametral fibers 18 are typically 5–10 microns in diameter and made from a carbon fiber. Larger and stiffer diametral fibers 18 may be used with a larger composite fiber-resin tubing 12 or as a situation may require. The present invention also contemplates using fibers other than carbon fiber for both the composite fiber-resin tubing 12 or the diametral fiber truss 14.

The diametral fibers 18 form circular bundles around the wires 16 and 16' and are attached thereon through twists 20. As shown in FIG. 6, the diametral fibers 18 are of equal length from the center of the diametral fiber truss 14. The diameter of the diametral fiber truss 14 is also substantially the same as the inside diameter of the composite fiber-resin tubing 12. The diametral fibers 18 are connected to the composite fiber-resin tubing 12 with resin. Preferably the composite fiber-resin structural member 10 would have on the order of one million diametrally adhered diametral fibers 18 per lineal inch of axis. The tensile strength of the diametral fibers provides structural strength to the composite fiber-resin tubing 12. Because the diametral fibers 18 are lightweight the strength to weight ratio of the composite fiber-resin structural member 10 of the present invention is thereby increased.

Referring to FIGS. 1–4, the diametral fiber truss 14 is manufactured by placing diametral fibers 18 of similar length between the two wires 16 and 16'. The wires 16 and 16' are then twisted causing the diametral fibers 18 to spirally rotate forming a screw of diametral fibers 18 with the wires 16 and 16' as its axis. The twisting applies a torsional constriction to the diametral fibers 18 which causes them to overlap and intersect with the adjacent diametral fibers 18 of the next closest twist 20.

Figure 1:
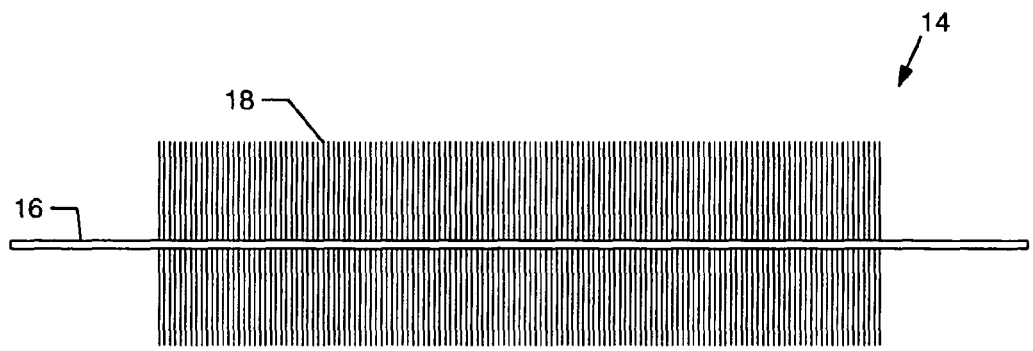
FIG. 1 is a front view of parallel diametral fibers centrally interfaced between two wires.
Figure 2:
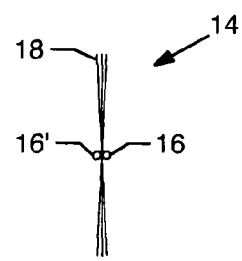
FIG. 2 is an end view of the structure of FIG. 1.
Figure 3:
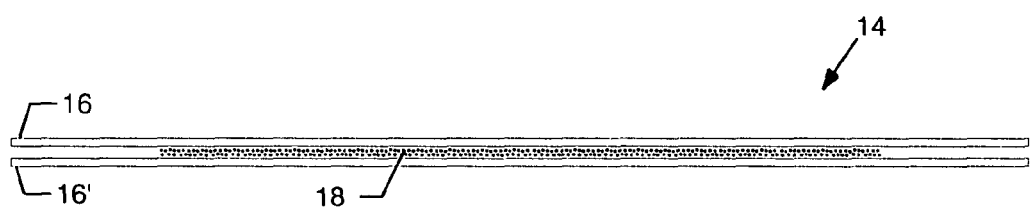
FIG. 3 is a top view of the structure of FIG. 1.
Figure 4:
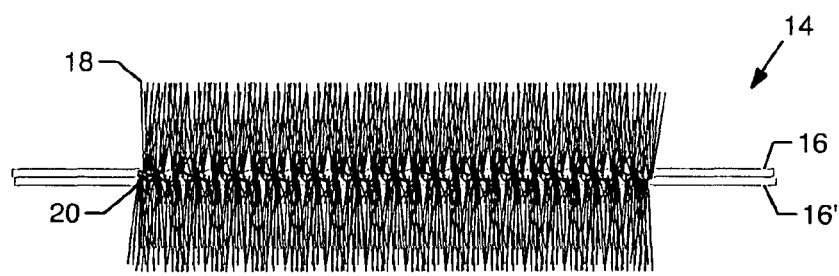
FIG. 4 is an elevational view of a diametral fiber truss embodying the invention.
Figure 5:
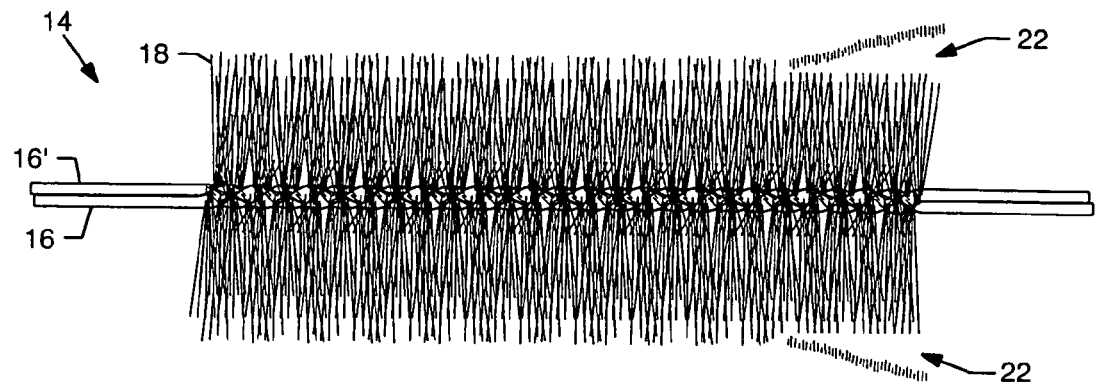
FIG. 5 is an elevation view of the diametral fiber truss of FIG. 4 having a portion of the diametral fibers cut.

As shown in FIG. 5, a cut 22 is made in the diametral fiber truss 14 such that the diametral fibers are all equidistant from the center of the diametral fiber truss 14. FIG. 5 shows the diametral fiber truss 14 partially cut. A complete cut of the diametral fiber truss 14 shapes the diametral fibers 18 such that their tips form a nearly perfect cylinder. To minimize the wasted portion of diametral fibers 18 that the cut 22 creates, the original length of the diametral fibers 18 should be approximately 1.25 times the diameter of the composite fiber-resin tubing 12.

The completely cut diametral fiber truss 14 is then inserted into the composite fiber-resin tubing 12. The tips of the diametral fibers are attached to the composite fiber-resin tubing 12 using a resin adhesive to form a bond that is at least as great as the tensile strength of the diametral fiber 18. To minimize the weight of the composite fiber-resin structural member 10, the diametral fibers 18 are attached to the composite fiber-resin tubing 12 using only enough resin to make a bond which has a strength substantially equal to the tensile strength of the diametral fiber 18.

While the strongest composite fiber-resin structural member 10 is cylindrical, the composite fiber-resin structural member 10 could also take on many other different shapes such as hexagonal, square, etc. Hexagonal lengths for instance could be bundled together for secondary processing of larger members or parallel square lengths laid in opposing layers could form lightweight sheeting or even blocks.

The ultra lightweight composite fiber-resin structural member 10 and method of manufacture provide a structural member that is lightweight and economical by minimizing wasted materials and minimizing the amount of materials needed to build a structural member of a given strength. The light weight and economical nature of the composite fiber-resin structural member 10 of the present invention allows it to be used for a wide variety of constructions. Such constructions could include space and aeronautics construction, bicycle frames, furniture, scaffolding or even home construction.

Figure 7:
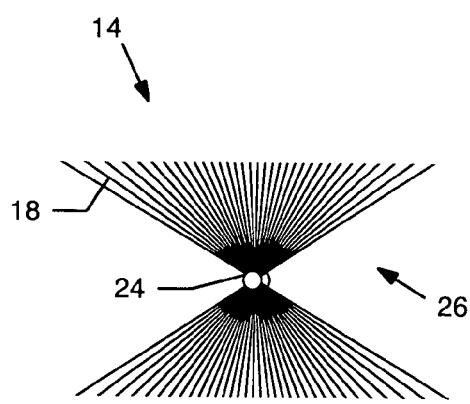
FIGS. 7 and 8 are end views of diametral fiber trusses having a wire textured to splay the diametral fibers at more angles.
Figure 8:
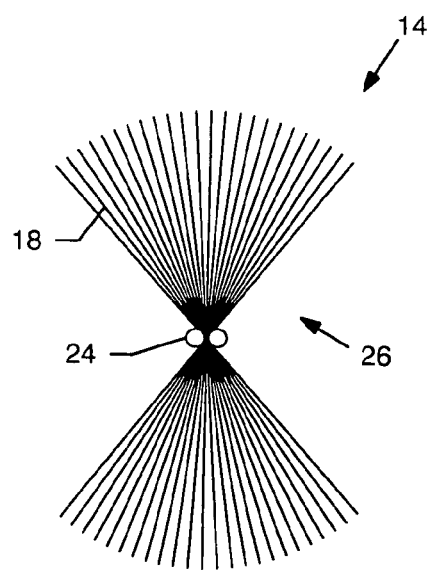

Referring to FIGS. 7 and 8, the diametral fiber truss 14 may have one or two mechanically textured axis wires 24. The mechanically textured axis wires 24 have a consistent and repeating distortion that will result in the bundling of like amounts of diametral fibers 18 at constant intervals along the longitudinal axis and causing the diametral fibers 18 to be placed at angles simultaneously obtuse 26 and acute 28 to the axis due to the flaring effect of mechanical constriction and torsion in each bundle. This acute placement of fibers will add a longitudinal zigzag truss effect, increasing the rigidity of the cylinder.

Although the invention has been described in detail for purposes of illustration, various modifications may be made without departing from the scope and spirit of the invention. Accordingly, the invention is not to be limited, except by the following claims.

What is claimed is:

1. A composite fiber-resin structural member, comprising:
    fiber-resin tubing including a central axis; and
    an elongated truss having a longitudinal axis and including at least two wires and a plurality of diametral fibers;
    wherein the truss fits within the fiber-resin tubing such that the central axis of the fiber-resin tubing and the longitudinal axis of the truss are coaxial and the diametral fibers are connected to the fiber-resin tubing with resin.

2. The structural member of claim 1, wherein the diametral fibers comprise carbon fiber.

3. The structural member of claim 1, wherein the diametral fibers form circular bundles around the wires.

4. The structural member of claim 1, wherein the diametral fibers are of substantially equal length from the longitudinal axis of the truss.

5. The structural member of claim 1, wherein a diameter of the truss is substantially the same as an inside diameter of the fiber-resin tubing.

6. The structural member of claim 1, wherein at least one of the wires of the truss is mechanically textured.

7. The structural member of claim 6, wherein the mechanically textured wire includes a repeating distortion along at least a portion of its length.

8. A composite fiber-resin structural member, comprising:
    fiber-resin tubing including a central axis; and
    an elongated truss having a longitudinal axis and including a wire and a plurality of diametral carbon fibers forming bundles around the wires;
    wherein the truss fits within the fiber-resin tubing such that the central axis of the fiber-resin tubing and the longitudinal axis of the truss are coaxial and the diametral fibers are connected to the fiber-resin tubing with resin.

9. The structural member of claim 8, wherein the diametral fibers are of substantially equal length from the longitudinal axis of the truss.

10. The structural member of claim 9, wherein a diameter of the truss is substantially the same as an inside diameter of the fiber-resin tubing.

11. The structural member of claim 8, wherein the wire is mechanically textured.

12. The structural member of claim 11, wherein the mechanically textured wire includes a repeating distortion along at least a portion of its length.

13. A composite fiber-resin structural member, comprising:
    fiber-resin tubing including a central axis; and
    an elongated truss having a longitudinal axis and including at least two wires and a plurality of diametral carbon fibers forming circular bundles around the wires;
    wherein the truss fits within the fiber-resin tubing such that the central axis of the fiber-resin tubing and the longitudinal axis of the truss are coaxial, the diametral fibers are connected to the fiber-resin tubing with resin, and wherein the diametral fibers are of substantially equal length from the longitudinal axis of the truss.

14. The structural member of claim 13, wherein at least one of the wires of the truss is mechanically textured.

15. The structural member of claim 14, wherein the mechanically textured wire includes a consistent and repeating distortion along at least a portion of its length.

* * * * *